(12) United States Patent
Watchel

(10) Patent No.: US 7,066,024 B2
(45) Date of Patent: Jun. 27, 2006

(54) FLOAT ADAPTED TO TRACK AN INTERFACE BETWEEN TWO LIQUIDS OF DIFFERING DENSITY

(76) Inventor: Brian Watchel, 6206-50th Avenue, Lloydminster, Alberta (CA) T9V 2C9

( * ) Notice: Subject to any disclaimer, the term of this patent is extended or adjusted under 35 U.S.C. 154(b) by 0 days.

(21) Appl. No.: 10/962,941

(22) Filed: Oct. 12, 2004

(65) Prior Publication Data

US 2005/0087014 A1 Apr. 28, 2005

(30) Foreign Application Priority Data

Oct. 24, 2003 (CA) ................................ 2444310

(51) Int. Cl.
*G01F 23/30* (2006.01)
*G01F 23/56* (2006.01)
*G01N 9/00* (2006.01)
*G01B 21/00* (2006.01)

(52) U.S. Cl. ............................. 73/444; 73/305; 73/319; 73/321; 73/309; 340/623; 116/228

(58) Field of Classification Search .................. 73/305, 73/309, 311, 321, 322.5, 319, 444; 340/623; 33/719; 116/228
See application file for complete search history.

(56) References Cited

U.S. PATENT DOCUMENTS

| 2,704,891 | A | * | 3/1955 | Ferrier et al. .................. 33/720 |
| 3,906,795 | A | * | 9/1975 | Kask ........................... 73/309 |
| 3,935,741 | A | * | 2/1976 | Zinsmeyer et al. ........... 73/313 |
| 3,946,625 | A | * | 3/1976 | Miyazaki et al. .......... 73/54.04 |
| 3,975,633 | A | * | 8/1976 | Larkin ..................... 250/237 R |
| 4,876,888 | A | * | 10/1989 | Ricketts et al. ............... 73/319 |
| 5,050,432 | A |  | 9/1991 | Barritt ......................... 73/309 |
| 5,408,874 | A | * | 4/1995 | Fleck et al. ............... 73/290 V |
| 5,989,414 | A | * | 11/1999 | Bzorgi ........................ 210/121 |

* cited by examiner

*Primary Examiner*—Hezron Williams
*Assistant Examiner*—Tamiko Bellamy
(74) *Attorney, Agent, or Firm*—Hahn Loeser & Parks, LLP; Keith J. Marcinowski

(57) ABSTRACT

A float adapted to track an interface between two liquids of differing density, includes a hollow buoyant body having an interior cavity adapted to retain liquid. At least one upper access opening is provided in the body, which is adapted to permit filling of the interior cavity with liquid. The interior cavity is capable of holding sufficient liquid to retard the buoyancy of the body. By filling the interior cavity with a liquid of a first density, the hollow buoyant body can be made to float at an interface with a lighter liquid of a second density.

7 Claims, 2 Drawing Sheets

FLOAT ADAPTED TO TRACK AN INTERFACE BETWEEN TWO LIQUIDS OF DIFFERING DENSITY

FIELD OF THE INVENTION

The present invention relates to a float, which is adapted to track an interface between two liquids of differing densities.

BACKGROUND OF THE INVENTION

Whenever two or more liquids of differing densities are placed into a storage tank, they tend to separate into layers based upon their densities. There are a variety of level indicators manufactured, which utilize floats. Existing floats tend to float on top of the liquid, giving an accurate indication as to the total liquid in the storage tank, but not an indication as to the relative levels of the different liquids.

SUMMARY OF THE INVENTION

What is required is a float, which is adapted to track an interface between two liquids of differing density.

According to one aspect of the present invention there is provided a float which includes a hollow buoyant body having an interior cavity adapted to retain liquid. At least one upper access opening is provided in the body which is adapted to permit filling of the interior cavity with liquid. The interior cavity is capable of holding sufficient liquid to retard the buoyancy of the body. By filling the interior cavity with a liquid of a first density, the hollow buoyant body can be made to float at an interface with a lighter liquid of a second density.

According to another aspect of the invention there is provided a method of tracking an interface between two liquids of differing density using a float. A first step involves providing a float, as described above. A second step involves filling the interior cavity of the float with sufficient liquid of a first density to retard the buoyancy of the body so that, when placed in a storage tank containing liquids of differing densities, the body will rise through the liquid of a first density, but will not have sufficient buoyancy with the added weight of the liquid in the interior cavity to rise past an interface with a lighter liquid of a second density.

Once the basic principles of the invention are understood, there are additional features which can be added to the float to enhance its operation.

Even more beneficial results may be obtained when the body is cylindrical and has more than one radial upper access opening positioned about its upper circumference. A container filled by liquid spilling over its upper peripheral edge, tends to sway. The radial access openings permit the float to remain stable during filling.

Even more beneficial results may be obtained when the cylindrical body has an inverted conical lower portion terminating in a cable attachment coupling. This permits a single point stable means of attachment from below.

Even more beneficial results may be obtained when the cylindrical body has a conical covering. The conical covering prevents settling solids from entering the interior cavity from above.

Even more beneficial results may be obtained when the cylindrical body has a peripheral flange with a top face, a bottom face and more than one cable guide channel extending through the flange between the top face and the bottom face. The use of guide cables ensures that the float will travel along a linear vertical path.

Even more beneficial results may be obtained when buoyancy is provided to the body by a buoyant floatation collar. This simplifies the manufacturing process. The body can be manufactured relatively inexpensively out of moulded polymer plastic, and the floatation collar with required buoyancy added later. It also permits the buoyancy of the float to be altered by selection from several floatation collars of varying buoyancy.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
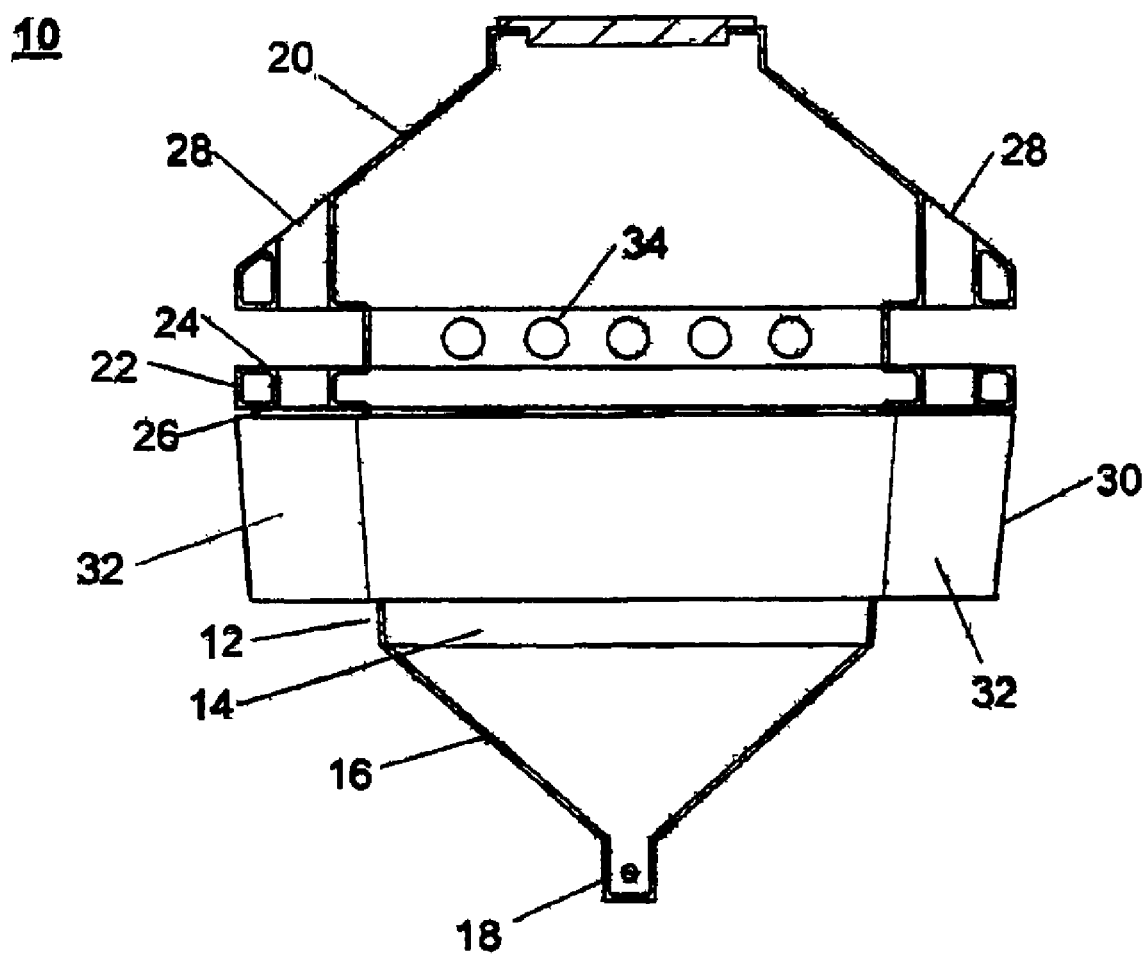
FIG. 1 is a side elevation view, in section, of a float constructed in accordance with the teachings of the present invention.

The preferred embodiment, a float generally identified by reference numeral 10, will now be described with reference to FIGS. 1 and 2.

Figure 2:
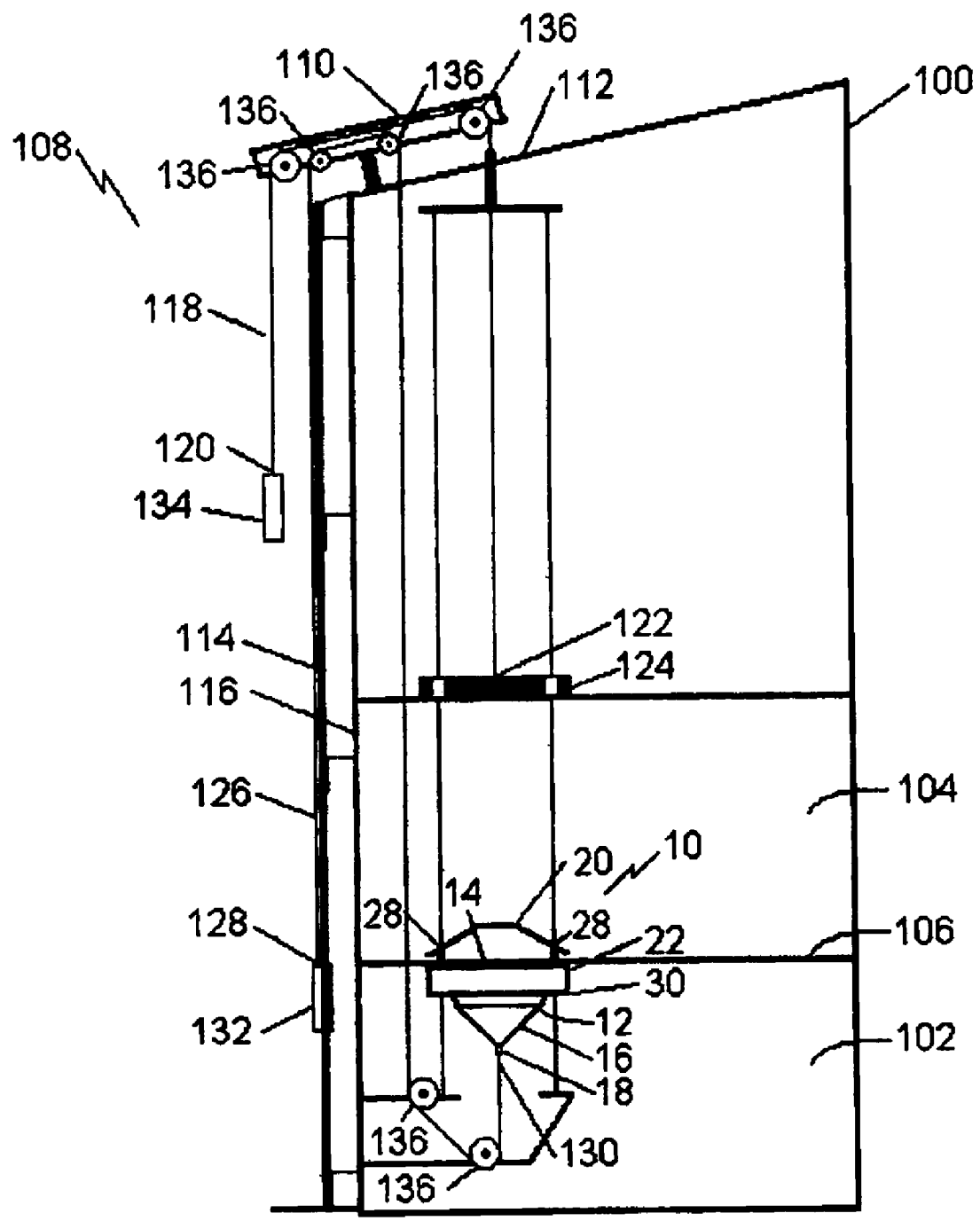
FIG. 2 is a side elevation view, in section, of a liquid storage tank containing two liquids of differing density equipped with the float illustrated in FIG. 1.

Structure and Relationship of Parts:

Referring to FIG. 1, float 10 has a hollow buoyant body 12 having an interior cavity 14 adapted to retain liquid. Body 12 is generally cylindrical with an inverted conical lower portion 16 terminating in a cable attachment coupling 18. A conical covering 20 is provided which is adapted to prevent solids from entering interior cavity 14. A peripheral flange 22 is provided. Flange 22 has a top face 24, a bottom face 26. Cable guide channels 28 extending through flange 22 between top face 24 and bottom face 26. Buoyancy is provided to body 12 by a buoyant floatation collar 30. Buoyant floatation collar 30 has buoyancy compartments 32, filled with a solid or gas, which provides additional buoyancy. In the illustrated example, buoyancy compartments 32 are filled with air. Several radial upper access openings 34 are positioned about a circumference of cylindrical body 12. Radial access openings 34 are adapted to permit filling of interior cavity 14 with liquid. As will hereinafter be further described, interior cavity 14 is capable of holding sufficient liquid to partially retard the buoyancy of body 12.

Operation:

The use and operation of float 10 will now be described. Referring to FIG. 2, there is illustrated a liquid storage tank 100 which contains two fluids of differing density divided into layers. For the purpose of illustration we will identify the layers as a lower water layer 102 and an upper oil layer 104. Oil layer 104 floats on top of water layer 102, with the interface between oil layer 104 and water layer 102, being identified as interface 106. A tank gauge is provided which is generally identified by reference numeral 108. Tank gauge 108 includes a cable support arm 110 positioned on top 112 of liquid storage tank 100. A gauge-board 114 with liquid level markings (not shown) is mounted to sidewall 116 of liquid storage tank. A first cable 118 is provided having a first end 120 and a second end 122. First end 120 is attached to a first level indicator 134 positioned adjacent to gauge-board 114. Second end 122 is secured to a conventional float 124, which floats on top of the accumulated liquid. A second cable 126 is provided having a first end 128 and a second end 130. First end 128 is attached to a second level indicator 132 positioned adjacent to gauge-board 114. Second end 130 passes through one or more direction altering guide pulleys 136 and then is attached to cable attachment coupling 18 of float 10 from below. In order to set float 10, a force is exerted upon second cable 126 is submerge float 10 in water layer 102. Water then passes through radial access openings 34 filling interior cavity 14 with sufficient water to retard the buoyancy of body 12. There is sufficient buoyancy provided by floatation collar 30 to enable body 12 to rise through water layer 102. However, with the added weight of the water in interior cavity 14, body 12 does not have sufficient buoyancy to rise past interface 106. A float 10 rises and falls with interface 106, the level of float 10 is reflected by second level indicator 132 on gauge-board 114.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A float, comprising:
   a hollow buoyant body having an interior cavity adapted to retain liquid, wherein the body is cylindrical and has a conical covering adapted to prevent solids from entering the interior cavity;
   at least one upper access opening in the body adapted to permit filling of the interior cavity with liquid;
   the interior cavity being capable of holding and retaining sufficient liquid to retard the buoyancy of the body, such that by filling the interior cavity with a liquid of a first density the hollow buoyant body can be made to float and indefinitely maintain a position in equilibrium at an interface with a lighter liquid of a second density.

2. The float as defined in claim 1, wherein the cylindrical body has has more than one radial upper access opening positioned about its upper circumference.

3. The float as defined in claim 2, wherein the cylindrical body has an inverted conical lower portion terminating in a cable attachment coupling.

4. The float as defined in claim 2, wherein the cylindrical body has a peripheral flange with a top face, a bottom face and more than one cable guide channel extending through the flange between the top face and the bottom face.

5. The float as defined in claim 1, wherein buoyancy is provided to the body by a buoyant floatation collar.

6. A float, comprising:
   a hollow buoyant body having an interior cavity adapted to retain liquid, the body being generally cylindrical with an inverted conical lower portion terminating in a cable attachment coupling, a conical covering adapted to prevent solids from entering the interior cavity and a peripheral flange with a top face, a bottom face and more than one cable guide channel extending through the flange between the top face and the bottom face, buoyancy is provided to the body by a buoyant floatation collar;
   several radial upper access openings positioned about a circumference of the cylindrical body adapted to permit filling of the interior cavity with liquid;
   the interior cavity being capable of holding and retaining sufficient liquid to retard the buoyancy of the body, such that by filling the interior cavity with a liquid of a first density the hollow buoyant body can be made to float and indefinitely maintain a position in equilibrium at an interface with a lighter liquid of a second density.

7. A method of tracking an interface between two liquids of differing density using a float, comprising the steps of:
   providing a float consisting of
      a hollow buoyant body having an interior cavity adapted to retain liquid, wherein the body is cylindrical and has a conical covering adapted to prevent solids from entering the interior cavity;
      at least one upper access opening in the body adapted to permit filling of the interior cavity with liquid;
   filling the interior cavity with sufficient liquid of a first density to retard the buoyancy of the body so that, when placed in a storage tank containing liquids of differing densities, the body will rise through the liquid of a first density and indefinitely maintain a position in equilibrium, but will not have sufficient buoyancy with the added weight of the liquid in the interior cavity to rise past an interface with a lighter liquid of a second density.

\* \* \* \* \*